Patented Feb. 12, 1929.

1,702,225

UNITED STATES PATENT OFFICE.

WILLIAM BURTON WESCOTT, OF BOSTON, MASSACHUSETTS, ASSIGNOR TO RUBBER LATEX RESEARCH CORPORATION, OF BOSTON, MASSACHUSETTS, A CORPORATION OF MASSACHUSETTS.

PROCESS OF MAKING RUBBER ARTICLES.

No Drawing. Application filed June 1, 1926. Serial No. 113,106.

This invention relates to processes of making rubber articles; and it comprises a method of making milled rubber and rubber compositions containing relatively long fiber wherein fiber is provided with a sheath or coating of rubber and is thereafter milled into a rubber composition while dry; all as more fully hereinafter set forth and as claimed.

In milling or plasticizing raw rubber, the rubber is passed repeatedly between a pair of rolls. This breaks up the reticulate structure of the rubber and gives a new homogeneous structure. Milling and the preparation of the ordinary rubber compounds are usually combined, the sulfur, fillers, rubber substitutes, etc., being added to the rubber as it goes through the mill. Almost any powder (including comminuated fiber) can be so added and intimately and uniformly incorporated. In the mill the rubber ruptures and rewelds in a way which is equivalent to a flow while the result of a thorough milling with pulverulent material may be likened to an emulsion with the rubber as the continuous phase and the added materials as the dispersoid. The nearer the milled composition approaches this ideal, the better is the composition. While the fiber can be, and is, used as one of the compounding ingredients with rubber on the mills, it is only as a very short or comminuted material equivalent to the ordinary powdery materials worked in. Untreated fiber of any substantial length, say, 0.25 inch or longer, shreds on the mills or it clumps up in aggregates which are not, so to speak, wet by the rubber; there is no cohering union between rubber and fiber with rubber between fiber and fiber. Untreated long fiber cannot be distributed through the rubber in such a way as to serve as a tension-limiting reinforcement.

In using comminuted fiber on the mills, that is as a filler for rubber, a common source is uncured friction scrap, that is cuttings and trimmings of fabric with rubber compound "frictioned" into locking engagement with its surface and interstices. This carries considerable rubber which is usually high grade and worth recovering. Before it is supplied to the rubber on the mills, the scrap is thoroughly comminuted in order to break up the cords and threads; this being necessary if no "unwet" fiber is to remain in the product. Friction scrap is generally put through special mills with serrated rolls, called rag mills. However it may be comminuted, milling for a considerable length of time is necessary in order to liberate all the fibers and expose their surfaces to contact with the rubber on the mills. Occasionally, a specially prepared "flock" is incorporated with the rubber on the mill, this flock being derived from clean cuttings of woven material cut up by a revolving knife. The cuttings are air separated and the coarse particles are returned to the knife until the end product ranges from a fiber dust to fiber having a maximum length of not more than one-eighth of an inch. Sometimes in making flock, clean, oil-free waste is used, that is, threads of spun and twisted fiber. Either way gives a final product in which the fiber is extremely short, being practically dust.

For many purposes, and notably shoe soles, it is desirable to have rubber, or rubber compounds, of a uniform texture but containing distributed long fiber to act as a tension resisting reinforcement. In certain other and copending applications, notably Serial Nos. 65,439 and 703,782, I have disclosed and claimed various processes wherein reinforced rubber containing distributed fiber is made with the aid of latex; latex being coagulated or gelled in the presence of fiber to produce a sheet or body of rubber including such fiber. This sheet or body possesses the general properties either of coagulation rubber or gelled rubber and not those of milled rubber. It is the purpose of the present invention to produce similar materials in which the rubber body is milled rubber or rubber composition—sheets, etc., of milled rubber containing distributed fiber of sufficient length to act as an extension restricting reinforcement.

I have discovered that by a certain expedient, it is possible to mill relatively long fiber into rubber and rubber compositions, with production of a material of uniform texture containing the fiber. This expedient is an incorporation of rubber into and on the fiber in cohering relation thereto, prior to the milling operation. This cohering rubber is secured by the use of latex which enters and penetrates the fiber and coats it. Where fiber is provided with a sheath or impregnation of raw rubber in this way, shearing and disintegration on the mill are much reduced or obviated and it is practicable to secure good incorporation before the length of the fiber is reduced too much. For example, in using one-quarter inch sheathed or impregnated fiber, by the time the fiber is incorporated into rubber with a sufficient uniformity, no great amount of it is usually less than one-eighth inch in length. Just how far comminution goes, of course, depends upon circumstances. For instance, the stiffer the compound, the longer is the time of incorporation required and the greater is the damage to the fiber; and, similarly, the spacing of the rolls has considerable influence. The incorporation of the rubberized fiber is sufficiently ready to permit its incorporation to be postponed until after that of the fillers and other materials to be used. In so doing, but little work is performed on the rubber while the fiber is being introduced. Sometimes, I work the fillers and the fiber in at the same time and particularly where a "fluffy" filler, such as carbon black, magnesium carbonate, etc., is used. If the carbon black be introduced at first, the mass may become too short to take the fiber well, while with an introduction of fiber prior to the introduction of the carbon black, the milling required to get the carbon black in afterwards may be excessive; enough to break up the fiber. In working any material into rubber on the mill, the time necessary is that required for the rubber to, so to speak, wet the other material. In the case of pre-rubberized fiber, the fiber is already wet with rubber.

In the present invention I am producing a reinforced rubber; a rubber containing distributed fiber of substantial length adapted to take tensile strains and to limit the extensibilty of the rubber in certain ways. The fiber exerts a stiffening effect; the magnitude of the effect not depending wholly on the amount of the fiber. It depends upon the length as well. For example, in two lots of materials produced under my invention, I have secured about the same extensibility with 10 per cent of relatively long fiber in the one and 20 per cent of somewhat shorter fiber in the other. I rarely desire fibers much longer than one-quarter inch, although where they are wanted, they can be incorporated. In a general way, fibers between three-eights and one-quarter inch are satisfactory. Something depends upon the particular fiber used. There is a difference between cotton and ramie, for instance.

While materials may be made under the present invention applicable for use in very many arts, I shall hereinafter describe the invention more particularly as applied to the manufacture of tread stocks for making rubber soles. In a rubber sole, a peculiar combination of properties is desirable. Along the length of the foot, flexibility and extensibility to a certain degree are desirable, while across the foot, flexibility and extensibility are disadvantageous. The shoe should not lose its shape. Soles made of raw sheeted plantation rubber, while excellent in many respects, lack this combination of properties, as do, to a less extent, compound soles.

In working the sheathed fiber into rubber between rolls, substantially all the fibers become longitudinally disposed in the sheet passing through the mills and if a shoe sole be cut from the resultant sheet across the line of movement in making, the sole will have all the fibers in transverse disposition. This limits sidewise extension and flexure, while permitting extension and flexibility longitudinal of the sole: the result I desire.

But, as stated, materials for other purposes than shoe soles may be made under the present invention, notably belting, gaskets, heels, automobile tread stocks, etc. For most of these purposes, as in shoe soles, the described type of unilateral extensibility is desirable. A material of a different character and useful for many purposes may be made by the expedient of passing the rubber sheet back through the mill in later passages with a more or less diagonal presentation. In milling fiber into rubber under the present invention, where this is not done substantially all the fibers become, as stated, longitudinally disposed in the sheet passing through the material. By diagonal representation, this disposition is altered.

A convenient source of fiber for the present purposes is ordinary comminuted tire scrap, relatively free of cohering rubber. Carder's waste, belt scrap, etc., are also convenient materials for the present purposes. These materials are soaked in latex and then directly dried, with or without exposure to a coagulant. Sometimes after the solid latex rubber is produced in and upon the fiber, I wash the material. Another source of material convenient for the present purposes is certain scrap produced in the utilization of the material described and claimed in the stated copending applications, notably Serial No. 65,439, filed October 28, 1925. In the process of this application, sheeted material suitable for making shoe soles is produced by the use of latex; a sheet being made of latex rubber containing distributed fiber. The amount of fiber contained in the material is relatively low, say, about 25 per cent of the whole. In cutting shoe soles from a sheet of this material, a certain amount of scrap is produced. This scrap may be milled directly without addition of more rubber; milling in the ordinary way and using fillers and compounding agents if desired. In this scrap, the fiber is thoroughly distributed and but little milling is required. Another source of fiber for the present purposes is material made according to the process of another copending application (Serial No. 71,405, filed November 25, 1925), wherein cotton fiber or the like is batted in the presence of some latex. This produces a fiber which is rubberized and can be worked into rubber in the mill. In this prior process, where the bat is converted into an open-textured, felt-like mass the felt lends itself to direct use in the mills. All these materials contain rubber derived from latex and in an unvulcanized condition.

Instead of using the scrap materials stated, any suitable fiber, animal, vegetable or mineral, may be directly rubberized with latex and used for my purposes. Cotton, ramie and many other fibers are suitable. Whatever the fiber is, it may be impregnated with commercial latex and then dried, giving gelled latex and fiber; or the latex may be coagulated in place by exposing the fiber to weak acetic acid or other coagulant, giving coagulation rubber. In either event, rubber is located in and on the fiber in permanently cohering relationship. The fiber is dried before use on the mill.

For the present purposes, latex may be defined as the milky juice of Hevea preserved against coagulation by the presence of a little ammonia. Latex of this type is a commercial article. By simple impregnation, using commercial 30 per cent latex, rubber-containing fiber may be produced carrying some 30 per cent of rubber. Less quantities can, of course, be incorporated by using diluted latex or in other ways, but I do not ordinarily desire much less than 15 per cent of rubber; that is, a material containing 85 per cent fiber and 15 per cent rubber.

In drying latex-impregnated fiber, I find vacuum drying with drying shelves at about 150° F. efficient and I try to carry the drying to a point where the moisture of the fiber is less than that normal to it under ordinary conditions. By drying at 150° F., I, of course, mean that the drying is finished at this temperature. Somewhat higher temperatures are practicable in the beginning when considerable moisture is still present. If light color be not an object in the finished material, the drying may be expedited by the use of higher temperatures than 150° F.; say, as high as 210° F. Material dried at the higher temperature, if exposed to the air and especially while warm, oxidizes somewhat, becomes darker in color and tackier; but it mills into rubber very readily and is sometimes desirable.

In practical embodiments of the present invention, milling of the sheathed fiber is effected in the ordinary way, using the ordinary rubber compositions and the ordinary fillers, zinc white, carbon, whiting, etc. After the milling operation, the material ordinarily leaves the mill as a more or less irregular sheet. In this sheet the added fibers are, as stated, more or less orientated with their length tending to lie longitudinally of the emerging sheet. The longer the milling, or the closer together are the rolls, the greater is this tendency.

The rubber composition used in the mills and in which the fiber is incorporated may be any of those used in the art. In the art of making rubber articles, very often the amount of rubber substitutes and surrogates and of reclaimed rubber present is greater than that of the new rubber. Whatever the composition of the milled material as regards rubber and rubber substitutes, all other things present are in finely divided form. Milled rubber is ordinarily a mixture of extremely finely divided solid matters with a body of rubber or rubber composition. It is material of this character that I reinforce with fiber.

The sheathed material coming from the mill and containing the fiber, is cut into the desired shapes and vulcanized in the usual ways and by the usual apparatus. In vulcanizing, however, in making such an article as a shoe sole, the sole should be placed in a mold so that the sole fits the mold at the ends with some lateral play. And in cutting articles from the sheeted material due attention should be paid to the orientation of the contained fiber.

In all the materials made under the present invention, the fibers lie in ordered arrangement and are spaced and united by rubber. I do not contemplate making materials with less than 50 per cent rubber or rubber composition. With more fiber, the material becomes a cemented fiber rather than a reinforced rubber. Generally, 65 per cent is a safer lower limit for the rubber. In soles and similar articles, I usually desire about 75 per cent of rubber or rubber composition. For other purposes, the proportions may vary. In shoe soles, as stated, I desire to have the fibers lie across the sole. In shoe heels, it is better to have strata of fibers in different presentation; a result which may be attained by the diagonal feed previously mentioned. In belting, the threads or fiber should lie longitudinally, so that the belt may have not only limited extensibility lengthwise but also the desirable crosswise flexibility necessary to make it hug the crown of the pulley. In tubular articles, such as hose, the fiber should lie circumferentially to afford wall strength against bursting or compression, without materially limiting the flexibility of the hose.

In shoe soles and most other materials, a certain uniformity of texture is required and there should be a thorough dissemination of fiber with an absence of coarse aggregates, such as threads or cords. In some few articles, however, such as garden hose and other hose, where milled-in fiber is used to replace the usual woven reinforcement, localized occurrence of fiber is sometimes desirable. In such cases, latex-treated fiber bundles, and particularly those derived from friction scrap, may be used, care being taken to avoid too much comminution of the scrap and too much disintegration during milling. Likewise, in certain heavy duty rolls, such as wool scouring rolls, circumferentially disposed long threads or cords materially affect the resistance to tearing when pieces of metal, stone, or the like, pass between the rolls. Here it is desirable that the fibers be in the form of bonded threads or cords, since in a spun or twisted condition, their reinforcement value is increased.

Some of the advantages of the present invention can be secured by sheathing fiber otherwise than by the use of latex, as by working loose fiber into a benzol or bisulfid "solution" of raw rubber and evaporating off the solvent to leave a rubbery mass which will enter the mills. But this I do not recommend, because of considerations of cost, nuisance and risk, and because in materials so produced the fiber is merely coated and is not permeated with rubber. This method can however be used.

What I claim is:—

1. In the manufacture of reinforced rubber, the process which comprises distributing relatively long fibers impregnated with latex rubber through a rubber composition by milling the same thereinto.

2. In the manufacture of reinforced rubber, the process which comprises impregnating fiber with rubber derived from latex, drying to a sub-normal moisture content and milling the treated fiber into a rubber composition to distribute the same therein.

3. In the manufacture of reinforced rubber, the process which comprises impregnating fiber with latex, coagulating rubber in place, drying the treated fiber and milling into a rubber composition to distribute the same therein.

4. In the manufacture of reinforced rubber, the process which comprises impregnating rubber-containing fibrous scrap with latex, coagulating rubber in place, drying the treated fiber and milling into a rubber composition to distribute the same therein.

In testimony whereof, I have hereunto affixed my signature.

WILLIAM BURTON WESCOTT.